March 10, 1942.  R. E. GETCHELL  2,276,186
PULLEY CONSTRUCTION
Filed July 8, 1941
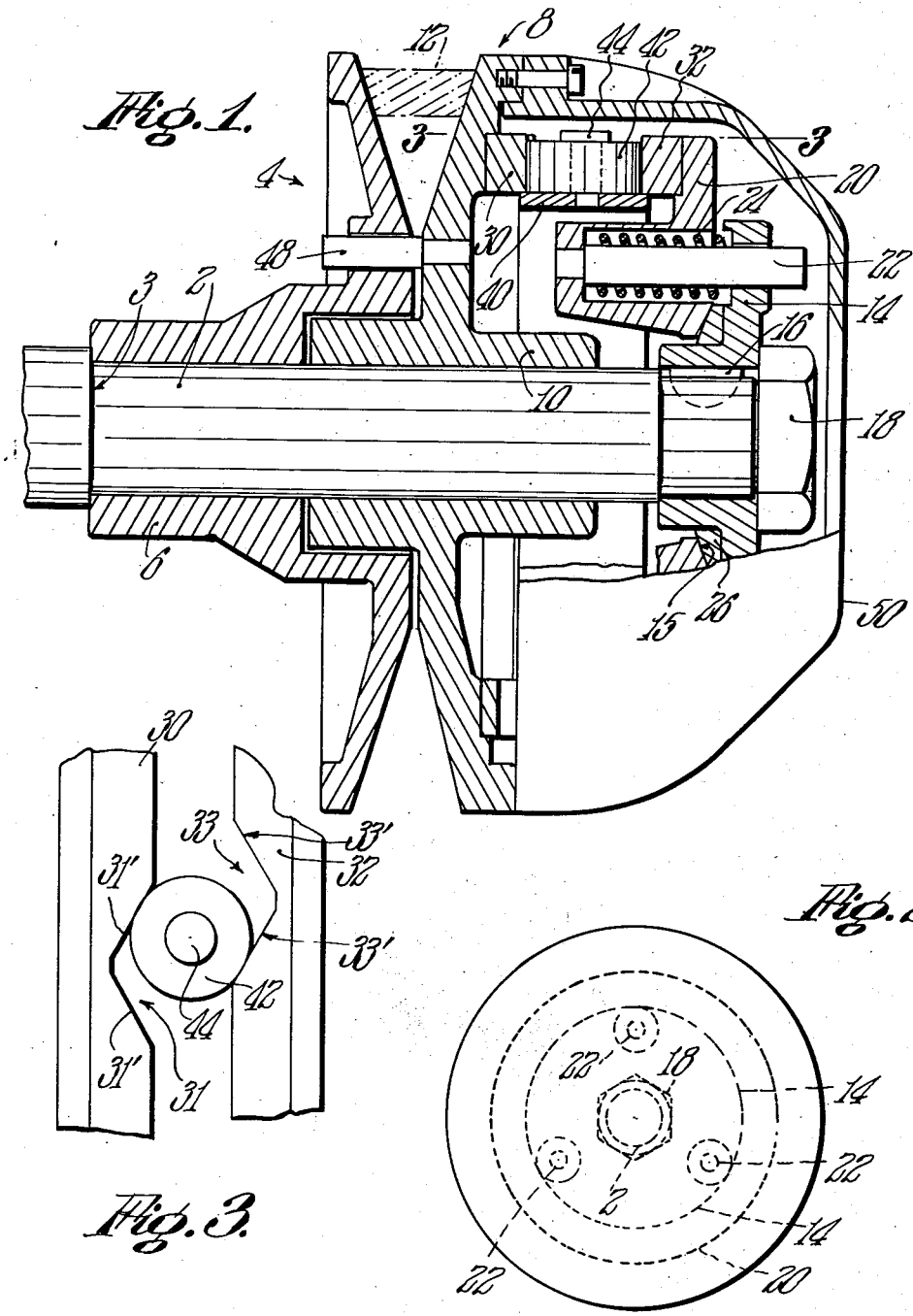
INVENTOR.
Raymond E. Getchell.
BY Walter C. Ross. Attorney.

Patented Mar. 10, 1942

2,276,186

UNITED STATES PATENT OFFICE 2,276,186

PULLEY CONSTRUCTION

Raymond E. Getchell, Holyoke, Mass., assignor to B. F. Perkins & Son, Inc., Holyoke, Mass., a corporation of Massachusetts Application July 8, 1941, Serial No. 401,455

8 Claims. (Cl. 74—230.17)

This invention relates to improvements in V-belt pulley construction. The principal objects of the invention are directed to the provision of a pulley construction for a V-belt that is self adjusting to facilitate constant speed.

The pulley construction of the invention is adapted for broad application but has one use in connection with a variable speed mechanism such as shown in my co-pending application Ser. No. 286,509 filed July 26, 1939, where it may be used on the control shaft of such a mechanism.

Various novel objects and features of construction will be observed from the following description of the present preferred form of the invention taken in connection with the drawing, wherein:

Fig. 1 is a partial sectional and side elevational view of a pulley construction embodying the novel features of the invention;

Fig. 2 is a small scale end elevational view of the pulley construction shown in Fig. 1; and Fig. 3 is a fragmentary plan view taken on the line 3—3 of Fig. 1.

Referring now to the drawing more in detail, the novel features of the invention will be fully described.

A shaft is represented by 2 which may be the control shaft of a variable speed mechanism such as has been referred to.

A half-pulley part 4 has a hub 6 rotatable on said shaft 2 and adjacent thereto there is a half-pulley part 8 having a hub 10 rotatable on said shaft. As shown the inner faces of said pulley parts are formed to receive a V belt 12 therebetween as indicated by dot-dash lines.

A spider 14 is keyed to the shaft 2 by a key 16 and is held thereon against axial displacement by a nut 18 in threaded engagement with the end of said shaft 2. A ring or disc 20 inside of the spider 14 has a plurality of outwardly extending pins 22 fixed thereto which are slidable in holes in the member 14, as shown. Springs such as 24 around the pins are disposed between the members 14 and 20 to urge the member 20 towards member 8.

A member 26 carried by the member 14 preferably of some fibrous composition has an inner curved surface against which a seat 15 on member 20 abuts.

Cam members 30 and 32 are rigidly associated with the members 8 and 20 and these each have a plurality of depressions or notches 31 and 32 to provide cam surfaces 31' and 33' all as shown in Fig. 3.

A ring 40 is disposed between members 8 and 20 and its outer periphery loosely engages the inner sides of members 30 and 32 so as to be supported thereby. Rolls such as 42 rotatable on studs such as 44 are provided, one for each pair of notches 31 and 32.

A plurality of pins 48 are fixed to pulley part 8 that fit in holes of pulley part 4 as shown in Fig. 3. These permit movements of member 8 towards and away from member 4 and insure simultaneous rotation of said pulley parts.

A cover such as 50 may be provided that is secured to pulley part 8 by screws as shown and serves to enclose the co-operating parts associated with said pulley part and shaft.

The operation will now be described. If it is assumed that the pulley construction is on a control shaft such as in the patent referred to the belt 12 will extend around an adjustable V pulley on another shaft parallel to shaft 2. As the said other pulley is adjusted to vary its diameter, the belt 12 according to the adjustment causes the pulley parts 4 and 8 to be moved towards or away from one another, the belt 12 being moved up or down or in or out relative to the said pulley parts. In other words, the location of belt 12 in the V groove between the pulley parts depends on the adjustment of the pulley referred to so that the belt according to its location provides a certain effective diameter, and thereby a certain speed relative to that of the other pulley.

It is desired that said speed be maintained but variations in load in the ordinary case may vary the speed. For instance, if the belt is running in a certain place on the pulley at a certain load and the load suddenly increases, the belt is pulled inwardly of the pulley so that the effective diameter of the belt and pulley is less whereby there is a change of speed. This difficulty is overcome by the present construction.

With the belt operating with the pulley in the position shown, the pulley parts 4 and 8 are simultaneously rotated. With reference to Fig. 3, it may be assumed that the direction of rotation of the pulley parts is as indicated by the arrow. Certain of the cam faces 31' acting on the rolls 42 which act on the cam faces 33' cause the member 32 to be rotated so that through pins 22 the member 14 is rotated so as to rotate shaft 2.

The relative positions of the rolls and cam surfaces depend on the distance between the pulley parts 4 and 8 and this depends on the position of the belt 12 in the pulley groove. With the belt adjusted for a certain diameter the cam surfaces will assume some certain relative position so long as the load or belt pull remains constant. Should the belt pull increase from the normal the pulley part 8 is moved towards the pulley part 4 to prevent the belt entering the pulley groove to result in a change of effective diameter and change of speed. The pulley part 4 is held against axial displacement by a shoulder 3 on shaft 2 or by a bearing for said shaft, not shown.

When the load increases the belt tends to move the member 8 away from member 4 which tends to cause the rolls 42 to ride up on the incline of surfaces 31' and 33' and this tends to move pulley part 8 towards pulley part 4 or at least overcomes the spreading tendency of the pulley parts and thereby maintains the effective diameter of the belt and pulley and the speed.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination with a shaft of a pulley construction comprising in combination, a pair of pulley half-parts rotatable on said shaft having inner inclined surfaces forming a V-groove for a V-belt, one of said half-parts held against axial displacement on said shaft by a shoulder provided thereon, driving connections between the other pulley half-part and shaft including compensating means urging said other half-part towards said one-half part when a belt in the pulley groove tends to move the former away from the latter half-part, said compensating means including cam members secured to said other half-part and a member connected to said shaft having pairs of inclined surfaces and rolls between the surfaces of the pairs thereof.

2. The combination with a shaft of a pulley construction comprising in combination, a pair of pulley half-parts rotatable on said shaft having inner inclined surfaces forming a V-groove for a V-belt, one of said half-parts held against axial displacement on said shaft by a shoulder provided thereon, driving connections between the other pulley half-part and shaft including compensating means urging said other half-part towards said one-half part when a belt in the pulley groove tends to move the former away from the latter half-part, said compensating means including annular cam members secured to said other half-part and a member connected to said shafts having opposed cam surfaces and rolls disposed between said opposed cam surfaces.

3. The combination with a shaft of a pulley construction comprising in combination, a pair of pulley half-parts rotatable on said shaft having inner inclined surfaces forming a V-groove for a V-belt, means holding one of said half-parts against axial displacement on said shaft, driving connections between the other pulley half-part and shaft including compensating means urging said other half-part towards said one-half part when a belt in the pulley groove tends to move the former away from the latter half-part, said compensating means including cam members secured to said other half-part and a member connected to said shaft having pairs of inclined surfaces and rolls between the surfaces of the pairs thereof.

4. The combination with a shaft of a pulley construction comprising in combination, a pair of pulley half-parts rotatable on said shaft having inner inclined surfaces forming a V-groove for a V-belt, means holding one of said half-parts against axial displacement on said shaft, driving connections between the other pulley half-part and shaft including compensating means urging said other half-part towards said one-half part when a belt in the pulley groove tends to move the former away from the latter half-part, said compensating means including annular cam members secured to said other half-part and a member connected to said shafts having opposed cam surfaces and rolls disposed between said opposed cam surfaces.

5. The combination with a shaft of a pulley construction comprising in combination, a pair of pulley half-parts rotatable on said shaft having inner inclined surfaces forming a V-groove for a V-belt, means holding one of said half-parts against axial displacement on said shaft, driving connections between the other pulley half-part and shaft including a member yieldably connected to said shaft outside said other half-part and adjacent sides of said member and half-part provided with opposed cam surfaces and a member therebetween.

6. The combination with a shaft of a pulley construction comprising in combination, a pair of pulley half-parts rotatable on said shaft having inner inclined surfaces forming a V-groove for a V-belt, means holding one of said half-parts against axial displacement on said shaft, driving connections between the other pulley half-part and shaft including a member yieldably connected to said shaft outside said other half-part and adjacent sides of said member and half-part provided with opposed cam surfaces and a member therebetween, and means associated with said half-parts to bring about simultaneous rotation thereof.

7. The combination with a shaft of a pulley construction comprising in combination, a pair of pulley half-parts rotatable on said shaft having inner inclined surfaces forming a V-groove for a V-belt, means holding one of said half-parts against axial displacement on said shaft, a member fixed to said shaft outside the other half-part, a member yieldingly mounted thereon adjacent said other half-part, adjacent sides of said other half-part and last named member provided with notches having inclined cam surfaces, and a member having rolls thereon operably disposed in said notches.

8. The combination with a shaft of a pulley construction comprising in combination, a pair of pulley half-parts rotatable on said shaft having inner inclined surfaces forming a V-groove for a V-belt, means holding one of said half-parts against axial displacement on said shaft, a member fixed to said shaft outside the other half-part, a member yieldingly mounted thereon adjacent said other half-part, adjacent sides of said other half-part and last named member provided with notches having inclined cam surfaces, a member having rolls thereon operably disposed in said notches, and means connecting said half-parts to facilitate simultaneous rotation thereof.

RAYMOND E. GETCHELL.